United States Patent
Radulescu et al.

(10) Patent No.: US 9,686,714 B2
(45) Date of Patent: *Jun. 20, 2017

(54) CELL IDENTIFICATION COLLISION DETECTION IN WIRELESS COMMUNICATIONS

(71) Applicant: QUALCOMM Incorporated, San Diego, CA (US)

(72) Inventors: Andrei Dragos Radulescu, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/959,543

(22) Filed: Dec. 4, 2015

(65) Prior Publication Data

US 2016/0088516 A1 Mar. 24, 2016

Related U.S. Application Data

(63) Continuation of application No. 13/799,143, filed on Mar. 13, 2013, now Pat. No. 9,210,597.

(51) Int. Cl.
*H04W 4/00* (2009.01)
*H04W 28/04* (2009.01)
(Continued)

(52) U.S. Cl.
CPC .......... *H04W 28/044* (2013.01); *H04W 8/26* (2013.01); *H04W 8/265* (2013.01); *H04W 24/04* (2013.01);
(Continued)

(58) Field of Classification Search
CPC ..... H04W 16/00; H04W 16/12; H04W 16/20; H04W 16/02; H04W 16/14; H04W 16/24;
(Continued)

(56) References Cited

U.S. PATENT DOCUMENTS

2009/0219905 A1 9/2009 Khandekar et al.
2010/0039992 A1 2/2010 Prakash et al.
(Continued)

FOREIGN PATENT DOCUMENTS

EP 2247151 A2 11/2010
EP 2405682 A2 1/2012
(Continued)

OTHER PUBLICATIONS

International Search Report and Written Opinion—PCT/US2014/022047—ISA/EPO—Oct. 16, 2014.
(Continued)

*Primary Examiner* — Temica M Beamer
(74) *Attorney, Agent, or Firm* — Muncy, Geissler, Olds & Lowe, P.C.

(57) ABSTRACT

Detecting local cell identifier collision by a base station may be achieved by receiving, at a first base station from a user device, a dedicated identifier associated with a second base station. The dedicated identifier may include or otherwise map to a user device identifier associated with the second base station and a local cell identifier associated with the second base station. Based on the dedicated identifier, it may be determined, at the first base station, that there is a local cell identifier collision between the first base station and the second base station.

20 Claims, 4 Drawing Sheets

(51) Int. Cl.
*H04W 24/04* (2009.01)
*H04W 8/26* (2009.01)
*H04W 74/00* (2009.01)
*H04W 76/02* (2009.01)
*H04W 84/04* (2009.01)

(52) U.S. Cl.
CPC ....... *H04W 74/002* (2013.01); *H04W 76/027* (2013.01); *H04W 76/028* (2013.01); *H04W 84/045* (2013.01)

(58) Field of Classification Search
CPC ..... H04W 16/10; H04W 16/18; H04W 24/00; H04W 24/02; H04W 36/00; H04W 36/04; H04W 36/08
USPC ............. 455/422.1, 443, 446, 448, 449, 436
See application file for complete search history.

(56) References Cited

U.S. PATENT DOCUMENTS

| | | |
|---|---|---|
| 2010/0311407 A1 | 12/2010 | Yao et al. |
| 2010/0317351 A1 | 12/2010 | Gerstenberger et al. |
| 2010/0323736 A1 | 12/2010 | Fischer et al. |
| 2011/0117908 A1 | 5/2011 | Huang et al. |
| 2011/0230199 A1 | 9/2011 | Patabandi et al. |
| 2011/0269426 A1 | 11/2011 | Hultin et al. |
| 2011/0274097 A1 | 11/2011 | Zhang et al. |
| 2012/0281527 A1 | 11/2012 | Sebire et al. |
| 2013/0142178 A1 | 6/2013 | Kim et al. |
| 2013/0301591 A1 | 11/2013 | Meyer et al. |
| 2014/0274029 A1 | 9/2014 | Radulescu et al. |

FOREIGN PATENT DOCUMENTS

| | | |
|---|---|---|
| EP | 2448330 A1 | 5/2012 |
| JP | 2012019468 A | 1/2012 |
| WO | 2011029292 A1 | 3/2011 |

OTHER PUBLICATIONS

Golaup A., et al., "Femtocell access control strategy in UMTS and LTE", IEEE Communications Magazine, IEEE Service Center, Piscataway, US, vol. 47, No. 9, Sep. 1, 2009 (Sep. 1, 2009), pp. 117-123, XP011283373.

Teyeb O., et al.., "Physical Cell Identity Assignment in Heterogeneous Networks," Vehicular Technology Conference (VTCFALL), IEEE, Sep. 3, 2012, pp. 1-5.

HTC Corporation: "PCI Confusion During the RRC Connection Re-establishment Procedure," 3GPP TSG-RAN WG2#67bis, 3GPP, Oct. 16, 2009, R2-095589, 2 pages.

Anonymous: "Technical Specification Group Radio Access Network; Evolved Universal Terrestrial Radio Access (E-UTRA); Radio Resource Control (RRC); Protocol specification (Release 11)", 3GPP Standard; 3GPP TS 36.331 V11.2.0, vol. RAN WG2, Dec. 19, 2012 (Dec. 19, 2012), XP002729254, Document consists of pp. 24-25, 130-131, 154-156, 164-181.

CELL IDENTIFICATION COLLISION DETECTION IN WIRELESS COMMUNICATIONS

CLAIM OF PRIORITY UNDER 35 U.S.C. §119

The present Application for Patent is a continuation of U.S. patent application Ser. No. 13/799,143, entitled "Cell Identification Collision Detection in Wireless Communications," filed Mar. 13, 2013, assigned to the assignee hereof, and expressly incorporated herein by reference in its entirety.

FIELD OF DISCLOSURE

Aspects of this disclosure relate generally to telecommunications, and more particularly to cell identification collision detection and the like.

BACKGROUND

Wireless communication systems are widely deployed to provide various types of communication content, such as voice, data, and so on. Typical wireless communication systems are multiple-access systems capable of supporting communication with multiple users by sharing available system resources (e.g., bandwidth, transmit power, etc.). Examples of such multiple-access systems include code division multiple access (CDMA) systems, time division multiple access (TDMA) systems, frequency division multiple access (FDMA) systems, orthogonal frequency division multiple access (OFDMA) systems, and others. These systems are often deployed in conformity with specifications such as third generation partnership project (3GPP), 3GPP long term evolution (LTE), ultra mobile broadband (UMB), evolution data optimized (EV-DO), etc.

In cellular networks, macro scale base stations (or macro NodeBs (MNBs)) provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in poor user experience.

To extend cellular coverage indoors, such as for residential homes and office buildings, additional small coverage, typically low power base stations have recently begun to be deployed to supplement conventional macro networks, providing more robust wireless coverage for mobile devices. These small coverage base stations are commonly referred to as Home NodeBs or Home eNBs (collectively, H(e)NBs), femto nodes, femtocells, femtocell base stations, pico nodes, micro nodes, etc., deployed for incremental capacity growth, richer user experience, in-building or other specific geographic coverage, and so on. Such small coverage base stations may be connected to the Internet and the mobile operator's network via a digital subscriber line (DSL) router or a cable modem, for example.

An unplanned deployment of large numbers of small coverage base stations, however, can be challenging in several respects. For example, in a macro network, each macro base station (or each sector or cell thereof) is assigned not only a global identifier (e.g., a global cell identifier (GCI), a sector identifier (SectorID), an access node identifier (ANID), or some other type of identifier), but also a local identifier (e.g., a physical cell identifier (PCI), a pilot pseudorandom number (PilotPN), or some other type of identifier). The local identifier can use fewer bits because of its limited geographical reach, and is therefore more amenable for use in modulating physical layer channels. In this way, a user device can efficiently search for waveforms, such as pilot signals, corresponding to different local identifiers to identify the cells in the user device's vicinity and demodulate their transmissions. For the same reasons, however, the number space allocated for local identifiers is relatively limited. Yet, it is desirable for a network operator to ensure that the same local identifier is not used by base stations that are relatively close to each other, in order to avoid identifier conflict (e.g., identifier collision and/or identifier confusion).

While this may be feasible in a traditional planned network, it may not be feasible in an unplanned or ad-hoc network such as one employing many small coverage base stations. In such networks, the network operator or a customer often deploys the small scale base station without knowing which local identifiers would cause identifier conflict in the network. Thus, there is a need for effective techniques for detecting identifier conflict in wireless networks, such that remedial action can be taken.

SUMMARY

Example embodiments of the invention are directed to systems and methods for detecting identifier conflict in wireless networks.

In some embodiments, a method is provided for detecting local cell identifier collision by a base station. The method may comprise, for example: receiving, at a first base station from a user device, a dedicated identifier associated with a second base station, wherein the dedicated identifier includes or otherwise maps to a user device identifier associated with the second base station and a local cell identifier associated with the second base station; and determining, at the first base station, that there is a local cell identifier collision between the first base station and the second base station based on the dedicated identifier.

In other embodiments, an apparatus is provided for detecting local cell identifier collision by a base station. The apparatus may comprise, for example, at least one processor configured to: receive, at a first base station from a user device, a dedicated identifier associated with a second base station, wherein the dedicated identifier includes or otherwise maps to a user device identifier associated with the second base station and a local cell identifier associated with the second base station, and determine, at the first base station, that there is a local cell identifier collision between the first base station and the second base station based on the dedicated identifier. The apparatus may accordingly also comprise, for example, memory coupled to the at least one processor.

In still other embodiments, another apparatus is provided for detecting local cell identifier collision by a base station. The apparatus may comprise, for example: means for receiving, at a first base station from a user device, a dedicated identifier associated with a second base station, wherein the dedicated identifier includes or otherwise maps to a user device identifier associated with the second base station and a local cell identifier associated with the second base station; and means for determining, at the first base station, that there is a local cell identifier collision between the first base station and the second base station based on the dedicated identifier.

In still other embodiments, a computer-readable medium is provided comprising code, which, when executed by at least one processor, causes the at least one processor to perform operations for detecting local cell identifier collision by a base station. The computer-readable medium may comprise, for example: code for receiving, at a first base station from a user device, a dedicated identifier associated with a second base station, wherein the dedicated identifier includes or otherwise maps to a user device identifier associated with the second base station and a local cell identifier associated with the second base station; and code for determining, at the first base station, that there is a local cell identifier collision between the first base station and the second base station based on the dedicated identifier.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. The term "embodiments of the invention" does not require that all embodiments of the invention include the discussed feature, advantage, or mode of operation, and alternate embodiments may be devised without departing from the scope of the invention. Additionally, well-known elements of the invention may not be described in detail or may be omitted so as not to obscure the relevant details of the invention.

The terminology used herein is for the purpose of describing particular embodiments only and is not intended to be limiting of all embodiments of the invention. As used herein, the singular forms "a," "an," and "the" are intended to include the plural forms as well, unless the context clearly indicates otherwise. It will be further understood that the terms "comprise," "comprising," "include," and/or "including," when used herein, specify the presence of stated features, integers, steps, operations, elements, and/or components, but do not preclude the presence or addition of one or more other features, integers, steps, operations, elements, components, and/or groups thereof.

The techniques described herein may be employed in networks that include macro scale coverage (e.g., a large area cellular network such as 3G or 4G networks, typically referred to as a macro cell network) and smaller scale coverage (e.g., a residence-based or building-based network environment). As a user device moves through such networks, the user device may be served in certain locations by base stations that provide macro coverage and at other locations by base stations that provide smaller scale coverage. As discussed briefly in the background above, the smaller coverage base stations may be used to provide incremental capacity growth, in-building coverage, and in some cases different services for a more robust user experience. In the discussion herein, a base station that provides coverage over a relatively large area is usually referred to as a macro base station, while a base station that provides coverage over a relatively small area (e.g., a residence) is usually referred to as a femto base station. Intermediate base stations that provide coverage over an area that is smaller than a macro area but larger than a femto area are usually referred to as pico base stations (e.g., providing coverage within a commercial building). For convenience, however, the disclosure herein may describe various functionalities related to small coverage base stations in the context of a femto base station, with the understanding that a pico base station may provide the same or similar functionality for a larger coverage area. A cell associated with a macro base station, a femto base station, or a pico base station may be referred to as a macrocell, a femtocell, or a picocell, respectively. In some system implementations, each cell may be further associated with (e.g., divided into) one or more sectors.

In various applications, it will be appreciated that other terminology may be used to reference a macro base station, a femto base station, a pico base station, a user device, and other devices, and that the use of such terms is generally not intended to invoke or exclude a particular technology in relation to the embodiments described or otherwise facilitated by the description herein. For example, a macro base station may be configured or alternatively referred to as a macro node, access node, access point, NodeB, evolved NodeB (eNodeB), macrocell, and so on. A femto base station may be configured or alternatively referred to as a femto node, Home NodeB, Home eNodeB, access point base station, femtocell, and so on. A user device may be configured or alternatively referred to as a device, user equipment (UE), subscriber unit, subscriber station, mobile station, mobile device, access terminal, and so on. For convenience, the disclosure herein will tend to describe various functionalities in the context of generic "base stations" and "user devices," which, unless otherwise indicated by the particular context of the description, are intended to cover the corresponding technology and terminology in all wireless systems.

Figure 1:
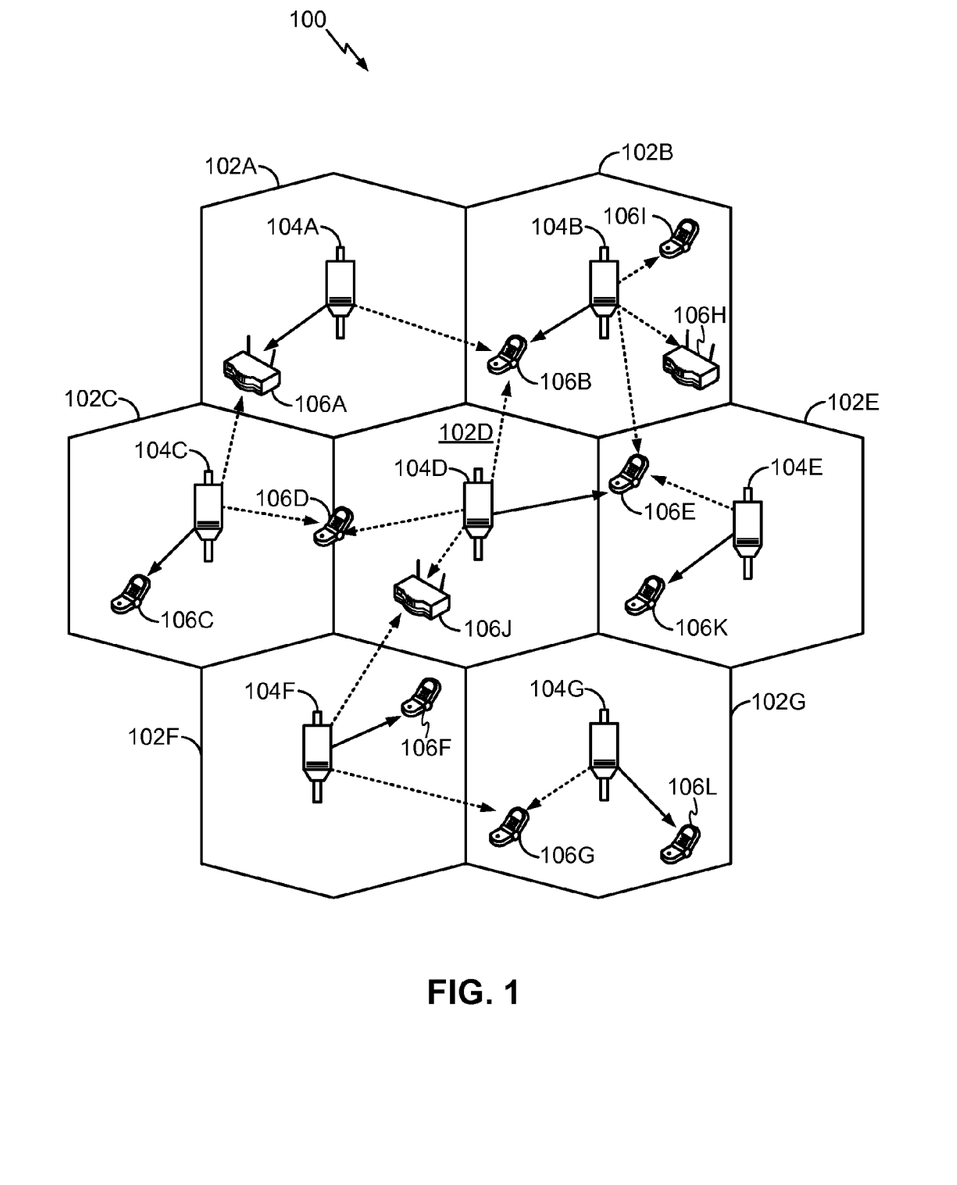
FIG. 1 illustrates an example wireless communication network demonstrating the principles of multiple access communication.

FIG. 1 illustrates an example wireless communication network demonstrating the principles of multiple access communication. The illustrated wireless communication network 100 is configured to support communication between a number of users. As shown, the wireless communication network 100 may be divided into one or more cells 102, such as the illustrated cells 102A-102G. Communication coverage in cells 102A-102G may be provided by one or more base stations 104, such as the illustrated base stations 104A-104G. In this way, each base station 104 may provide communication coverage to a corresponding cell 102. The base station 104 may interact with a plurality of user devices 106, such as the illustrated user devices 106A-106L.

Each user device 106 may communicate with one or more of the base stations 104 on a forward link (FL) and/or a reverse link (RL). In general, a FL is a communication link from a base station to a user device, while a RL is a communication link from a user device to a base station. The base stations 104 may be interconnected by appropriate wired or wireless interfaces allowing them to communicate with each other and/or other network equipment. Accordingly, each user device 106 may also communicate with another user device 106 through one or more of the base stations 104. For example, the user device 106J may communicate with the user device 106H in the following manner: the user device 106J may communicate with the base station 104D, the base station 104D may then communicate with the base station 104B, and the base station 104B may then communicate with the user device 106H, allowing communication to be established between the user device 106J and the user device 106H.

The wireless communication network 100 may provide service over a large geographic region. For example, the cells 102A-102G may cover a few blocks within a neighborhood or several square miles in a rural environment. As noted above, in some systems, each cell may be further divided into one or more sectors (not shown). In addition, the base stations 104 may provide the user devices 106 access within their respective coverage areas to other communication networks, such as the Internet or another cellular network. As further mentioned above, each user device 106 may be a wireless communication device (e.g., a mobile phone, router, personal computer, server, etc.) used by a user to send and receive voice or data over a communications network, and may be alternatively referred to as an access terminal (AT), a mobile station (MS), an access terminal, etc. In the example shown in FIG. 1, the user devices 106A, 106H, and 106J comprise routers, while the user devices 106B-106G, 106I, 106K, and 106L comprise mobile phones. Again, however, each of the user devices 106A-106L may comprise any suitable communication device.

Figure 2:
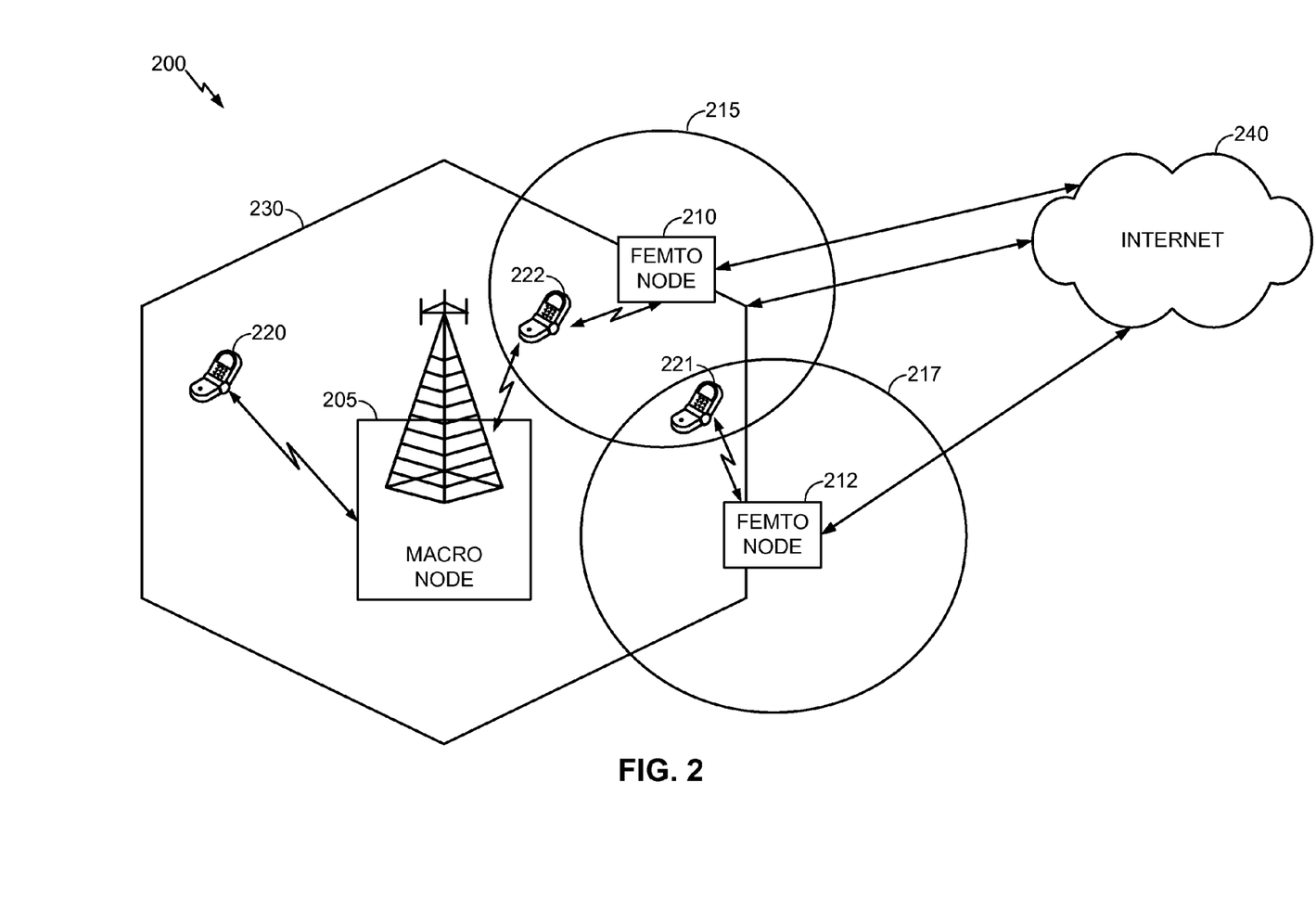
FIG. 2 illustrates an example mixed communication network environment in which femto cells are deployed in conjunction with macro cells.

FIG. 2 illustrates an example mixed communication network environment in which femto cells are deployed in conjunction with macro cells. Here, a macro base station 205 may provide communication coverage to one or more user devices, such as the illustrated user devices 220, 221, and 222, within a macro area 230, while femto base stations 210 and 212 may provide their own communication coverage within respective femto areas 215 and 217, with varying degrees of overlap among the different coverage areas. In this example, at least some user devices, such as the illustrated user device 222, may be capable of operating both in macro environments (e.g., macro areas) and in smaller scale network environments (e.g., residential, femto areas, pico areas, etc.).

In the connections shown, the user device 220 may generate and transmit a message via a wireless link to the macro base station 205, the message including information related to various types of communication (e.g., voice, data, multimedia services, etc.). The user device 222 may similarly communicate with the femto base station 210 via a wireless link, and the user device 221 may similarly communicate with the femto base station 212 via a wireless link. The macro base station 205 may also communicate with a corresponding wide area or external network 240 (e.g., the Internet), via a wired link or via a wireless link, while the femto base stations 210 and 212 may also similarly communicate with the network 240, via their own wired or wireless links. For example, the femto base stations 210 and 212 may communicate with the network 240 by way of an Internet Protocol (IP) connection, such as via a digital subscriber line (DSL, e.g., including asymmetric DSL (ADSL), high data rate DSL (HDSL), very high speed DSL (VDSL), etc.), a TV cable carrying IP traffic, a broadband over power line (BPL) connection, or some other link.

The network 240 may comprise any type of electronically connected group of computers and/or devices, including, for example, the following networks: Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 240 includes network variations such as the public Internet, a private network within the Internet, a secure network within the Internet, a private network, a public network, a value-added network, an intranet, and the like. In certain systems, the network 240 may also comprise a virtual private network (VPN).

Accordingly, it will be appreciated that the macro base station 205 and/or either or both of the femto base stations 210 and 212 may be connected to the network 240 using any of a multitude of devices or methods. These connections may be referred to as the "backbone" or the "backhaul" of the network. Devices such as a radio network controller (RNC), base station controller (BSC), or another device or system (not shown) may be used to manage communications between two or more macro base stations, pico base stations, and/or femto base stations. In this way, depending on the current location of the user device 222, for example, the user device 222 may access the communication network 240 by the macro base station 205 or by the femto base station 210.

For identification purposes, each base station in the network 200 may be assigned or otherwise select a local cell identifier (e.g., a physical cell identifier (PCI), a pilot pseudorandom number (PilotPN), or some other type of identifier) intended to be unique in a given geographical region. User devices may attempt to uniquely identify each base station by detecting a beacon or pilot signal transmitted from the base station in accordance with the base station's local cell identifier. For example, the user device 221 may receive pilot signals from each of the femto base stations 210 and 212 encoded in accordance with their respective local cell identifiers, and attempt to distinguish between the two base stations according thereto. In some embodiments, the user device 221 may further use the received pilot signals to generate a pilot strength measurement report (PSMR), or some other indicator of signal quality.

As discussed in the background above, because of its limited geographical reach, the local cell identifier can be use a relatively small number of bits and still be in principle (locally) unique in a given area, thereby facilitating more efficient identification with less overhead signaling and/or processing as compared to, for example, a more global identifier (e.g., a global cell identifier (GCI), a sector identifier (SectorID), an access base station identifier (ANID), or some other type of identifier). However, for the same reasons, the quantity of local cell identifiers defined in a given system is limited (e.g., on the order of one to several hundred in some systems). Meanwhile, femto base stations, such as the femto base stations 210 and 212 in FIG. 2, may be deployed in potentially large numbers throughout homes, apartment buildings, office buildings, etc., and by individual consumers without the central planning conventionally used in macro networks to coordinate the distribution of local cell identifiers. Thus, as further discussed in the background above, identifier conflict among base stations in femto networks as well as mixed networks, and the problems associated therewith, have the potential to be more widespread and more detrimental than in conventional macro networks where deployment and base station identification is more closely controlled.

In one particular type of conflicting use, referred to as identifier "collision," two base stations in close proximity to one another may inadvertently use the same local cell identifier in a manner that causes a user device in that region to concurrently receive signals (e.g., pilot signals) comprising the same local cell identifier from two otherwise distinct base stations. In general, identifier collision may occur whenever the local cell identifier of a given base station is not unique within the coverage area of that base station. This scenario is illustrated in FIG. 2, for example, by the overlapping femto coverage areas 215 and 217 of the femto base stations 210 and 212, respectively. If both femto base stations 210 and 212 are assigned or otherwise select the same local cell identifier, a user device (e.g., the user device 221 in FIG. 2) may concurrently receive signals encoded with the same identifier from both femto base stations 210 and 212, despite the fact that femto base stations 210 and 212 are in fact separate and distinct entities.

The resulting identifier collision between femto base stations 210 and 212 may lead to several problems. For example, the user device 221 may not be able to properly decode messages from either of the femto base stations 210 or 212 (e.g., because the channel conditions that the user device 221 estimates from the concurrently received signals will not correspond to the actual conditions on a channel associated with either of the femto base stations 210 or 212). Further, the user device 221 may not be able to detect when it moves from the femto coverage area 215 of the femto base station 210 into the femto coverage area 217 of the femto base station 212 (e.g., since the pilot signal strength associated with the local cell identifier that the user device 221 is monitoring may remain relatively high despite the transition), and may therefore fail to register with the new the femto base station 212. This may lead to signaling outages, missed pages, dropped calls, and so on.

Some conventional approaches to addressing identifier conflict in mixed networks attempt to divide the available identifier space into mutually exclusive portions for overlay (e.g., macro) base stations and underlay (e.g., femto) base stations. However, while this type of partitioning may allow the identifiers assigned to the overlay base stations to be better planned among themselves, at least some of the identifiers assigned to the underlay base stations are likely to remain self-configured (e.g., autonomously configured by each underlay base station). Other conventional approaches to addressing identifier conflict include manually provisioning and managing neighbor cells by a network technician periodically scanning a given neighborhood, and/or automatically provisioning and managing neighbor cells by way of an automatic neighbor relation (ANR) function for a base station to manage a conceptual neighbor relation table (NRT) based on measurements of detected cells provided by various user devices or by the base station itself via its network listening module (NLM). Each of these conventional approaches has its own drawbacks and limitations.

Accordingly, various systems, methods, and techniques are provided herein for improved, alternative, and/or supplemental detection of identifier conflict in wireless networks, such that remedial action can be taken. For example, as discussed in more detail below, a base station may be configured according to the techniques provided herein to detect a local cell identifier collision based on certain behavior of the user device that is peculiar or otherwise out of the ordinary under normal operating conditions.

Figure 3:
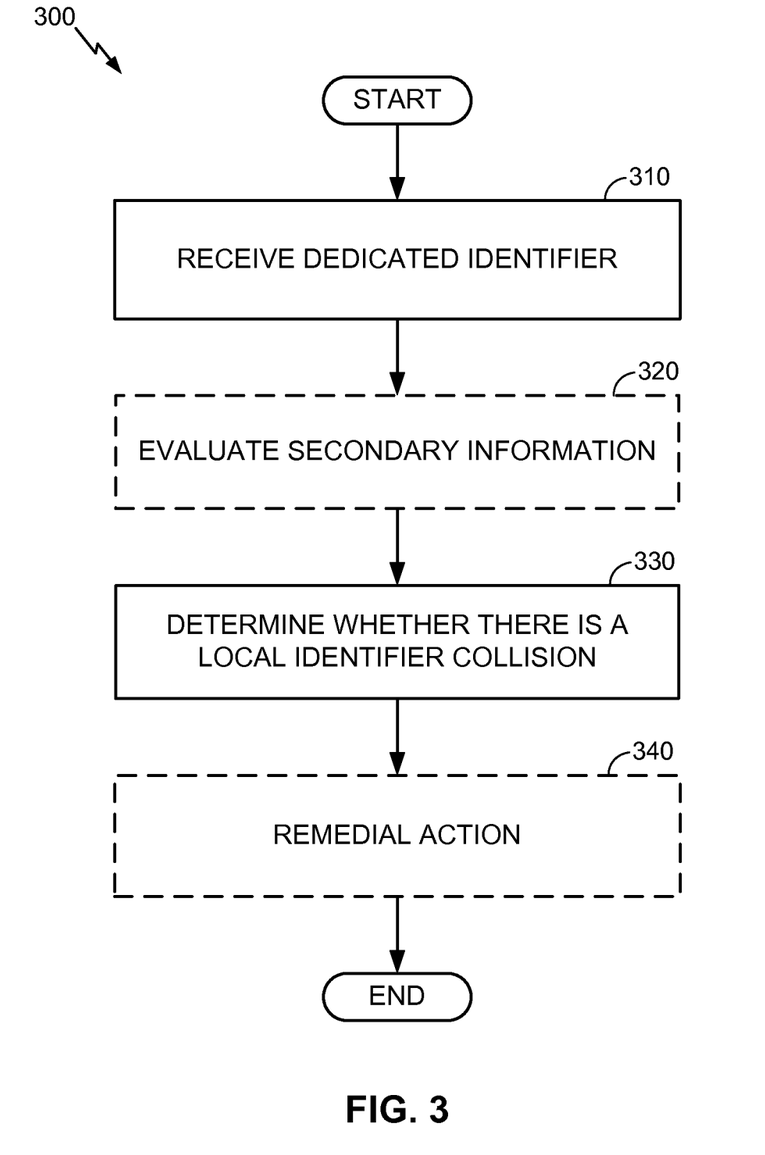
FIG. 3 illustrates an example method for detecting local cell identifier collision by a first base station based on a dedicated identifier associated with a second base station.

FIG. 3 illustrates an example method for detecting local cell identifier collision by a first base station based on a dedicated identifier associated with a second base station. The method may be performed, for example, by any of the base stations illustrated in FIG. 2, including femto base station 210, femto base station 212, and/or, in some systems, macro base station 205.

As shown, the procedure 300 begins with the first base station receiving a dedicated identifier from a user device that includes or otherwise maps to (i) a user device identifier associated with the second base station and (ii) a local cell identifier associated with the second base station (block 310). A reconnection message such as an RRCConnectionReestablishmentRequest message is one example of a message that may be received by a base station and include such a dedicated identifier. For example, with reference to FIG. 2, as the user device 221 in communication with the femto base station 212 traverses the boundary between the femto base station 212 and the femto base station 210, it may unexpectedly become out of sync with the femto base station 212 (e.g., if the femto base station 212 and the femto base station 210 have been assigned or otherwise selected the same local cell identifier, proper channel estimation and message decoding at the user device 221 may become impaired, leading to the out of sync condition). The out of sync condition may cause the user device 221 to declare a Radio Link Failure (RLF) and generate an RRCConnectionReestablishmentRequest message. In this scenario, the RRCConnectionReestablishmentRequest message may include a local cell identifier (e.g., a PCI) of the femto base station 212 acting as the serving cell where the failure occurred, a user device identifier associated with the user device 221 in relation to the same femto base station 212 (e.g., a Cell Radio Network Temporary Identifier (c-RNTI) assigned to the user device 221 by the femto base station 212), as well as other information (e.g., a short message authentication code for integrity protection (shortMAC-I) calculated using the identity of the femto base station 212 with which the re-establishment is requested).

Another example of a message that may be received by a base station and include a dedicated identifier of the type specified above is an RLF Report message. Such a message may be sent after reestablishment fails and the user device falls back to regular connection establishment procedures. At that time, the user device may indicate to the base station that it has an RLF Report and the base station may retrieve the RLF Report. The RLF report contains the user device identifier and local cell identifier as well as time information to help identify when the RLF Report was logged. Further, the dedicated identifier may in some instances include a global cell identifier (e.g., GCI) that maps to the local cell identifier (e.g., PCI) associated with the second base station, rather than include the local cell identifier directly.

Returning to FIG. 3, the first base station may use this dedicated identifier to determine that there is a local cell identifier collision between itself and the second base station (the identity of which may be unknown) (block 330). For example, the first base station may notice that the dedicated identifier lists its own local cell identifier but also includes certain conflicting information. Continuing with the scenario above, the femto base station 210 may detect that the PCI received in the RRCConnectionReestablishmentRequest message matches its own PCI (i.e., the PCI of the femto base station 210) but that the c-RNTI does not match any of the c-RNTIs that the femto base station 210 has assigned to any user devices that it is serving (e.g., the user device 222). Accordingly, the femto base station 210 may determine that the RRCConnectionReestablishmentRequest message is in fact intended for another neighboring base station using the same PCI as itself (i.e., the femto base station 212 in this example, although its identity may be unknown to the femto base station 210). In this way, the femto base station 210 may recognize that there is a local cell identifier collision between itself and one of its neighbors based on the dedicated identifier information received from the user device 221.

In some instances, however, there may still be a local cell identifier collision even if the user device identifier matches one of the user device identifiers that the first base station has assigned to a user device that it is serving. This may occur, for example, simply by coincidence due to the finite number of possible user device identifiers. Returning again to the scenario above, the femto base station 210 may detect that the PCI received in the RRCConnectionReestablishmentRequest message matches its own PCI and that the c-RNTI also matches one of the c-RNTIs that the femto base station 210 has assigned to a user device (e.g., the user device 222). Although the matching identifiers may mean that there is in fact no local cell identifier collision at all, it is not dispositive.

In this case, the first base station may turn to secondary information included in the dedicated identifier to determine whether there is conflicting information that nevertheless points to a local cell identifier collision (optional block 330). For example, returning again to the scenario above, the RRCConnectionReestablishmentRequest message may also include a shortMAC-I authentication code for integrity protection calculated using the identity of the base station with which the re-establishment is requested (e.g., the femto base station 212 in this example). If the received PCI matches the PCI of the receiving femto base station 210 and the received c-RNTI matches a c-RNTI that the receiving femto base station 210 has assigned to a user device, the receiving femto base station 210 may nevertheless determine that there is a local cell identifier collision when the received shortMAC-I does not match the current shortMAC-I of the same user device that it has assigned the matching c-RNTI. Here as well, the femto base station 210 may recognize that there is a local cell identifier collision between itself and one of its neighbors based on the dedicated identifier information received from the user device 221.

In other embodiments, the dedicated identifier may further or alternatively include a preamble "signature" assigned to the user device by the second base station. A preamble signature generally refers to initial signaling that is sent for system access and may also be referred to as an access signature, an access probe, a random access probe, a signature sequence, a Random Access Channel (RACH) signature sequence, a Physical RACH (PRACH) signature sequence, etc. PRACH preamble signatures in WCDMA are described in 3GPP TS 25.211 section 5.2.2.1.2, for example, entitled "RACH preamble part," which is publicly available. In many systems, the signature space is partitioned into contention-based and contention-free subsets, such that user devices in a connected mode (e.g., Connected-DRX) may be assigned contention-free signatures to use for subsequent transmissions. The use of what appears to be a wrong or otherwise unexpected signature by a given user device may indicate the presence of a local cell identity collision, whereby the first base station is contacted by the user device using a preamble signature assigned by the second base station.

Accordingly, determining that there is a local cell identity collision may be further based, in some embodiments, on the first base station not having assigned the received preamble signature to any user devices. For example, with reference again to FIG. 2, the femto base station 210 may receive a preamble signature from the user device 221 that does not match any preamble signature(s) that the femto base station 210 has assigned to one of its own user devices (e.g., the user device 222). In this way, the femto base station 210 may recognize that there is a local cell identifier collision between itself and one of its neighbors (i.e., the one that assigned the received preamble to the user device 221—in this example, the femto base station 212).

In some instances, however, there may still be a local cell identifier collision even if the received preamble signature matches a preamble signature that the first base station has assigned to one of its user devices. Here as well, although the matching may mean that there is in fact no local cell identifier collision at all, it is not dispositive. In this case, the first base station may again turn to secondary information to identify a local cell identifier collision. For example, the first base station may determine that there is nevertheless a local cell identity collision if the preamble signature is received at an unexpected time (e.g., when the user device to which the first base station has assigned the received preamble signature is without any uplink data to send). Returning to the particular example above, if the femto base station 210 has assigned a given preamble signature to the user device 222 but unexpectedly receives that preamble signature in an access request when the user device 222 does not have any uplink data to send, the femto base station 210 may determine that a local cell identifier collision has occurred with another base station in its neighborhood. That is, the femto base station 210 may conclude that the preamble signature was in fact received from another user device (e.g., the user device 221 in this example) that does have uplink data to send but was assigned the preamble signature by a different base station (e.g., the femto base station 212), the coverage area of which the user device has unknowingly traveled outside of due to the local cell identifier collision.

Returning to FIG. 3, when a local cell identifier collision is detected, the first base station may take certain additional remedial actions, if desired, as deemed appropriate according to various embodiments (optional block 340). For example, the first base station may change its own local cell identifier, contact the second base station so that the second base station may change its local cell identifier, prompt a central planning entity (e.g., a technician) to adjust the deployment of local cell identifiers, change its transmit power, and so on.

One skilled in the art will understand that certain steps disclosed in the example flow diagram in FIG. 3 can be interchanged in their order without departing from the scope and spirit of the present disclosure. Also, one skilled in the art will understand that the steps illustrated in the flow diagram are not exclusive and that other steps may be included or one or more of the steps in the example flow diagram may be omitted without affecting the scope and spirit of the present disclosure.

Methods for detecting local cell identifier collision by a first base station based on a dedicated identifier associated with a second base station as provided herein may be implemented by a device configured as a communication device or as a processor or similar device for use within the communication device. For example, the device may include functional blocks representing functions implemented by a processor, software, hardware or a combination thereof (e.g., firmware), and may include one or more electrical components for performing the steps illustrated in blocks 310-340, as well as performing any associated or otherwise described operations herein.

Figure 4:
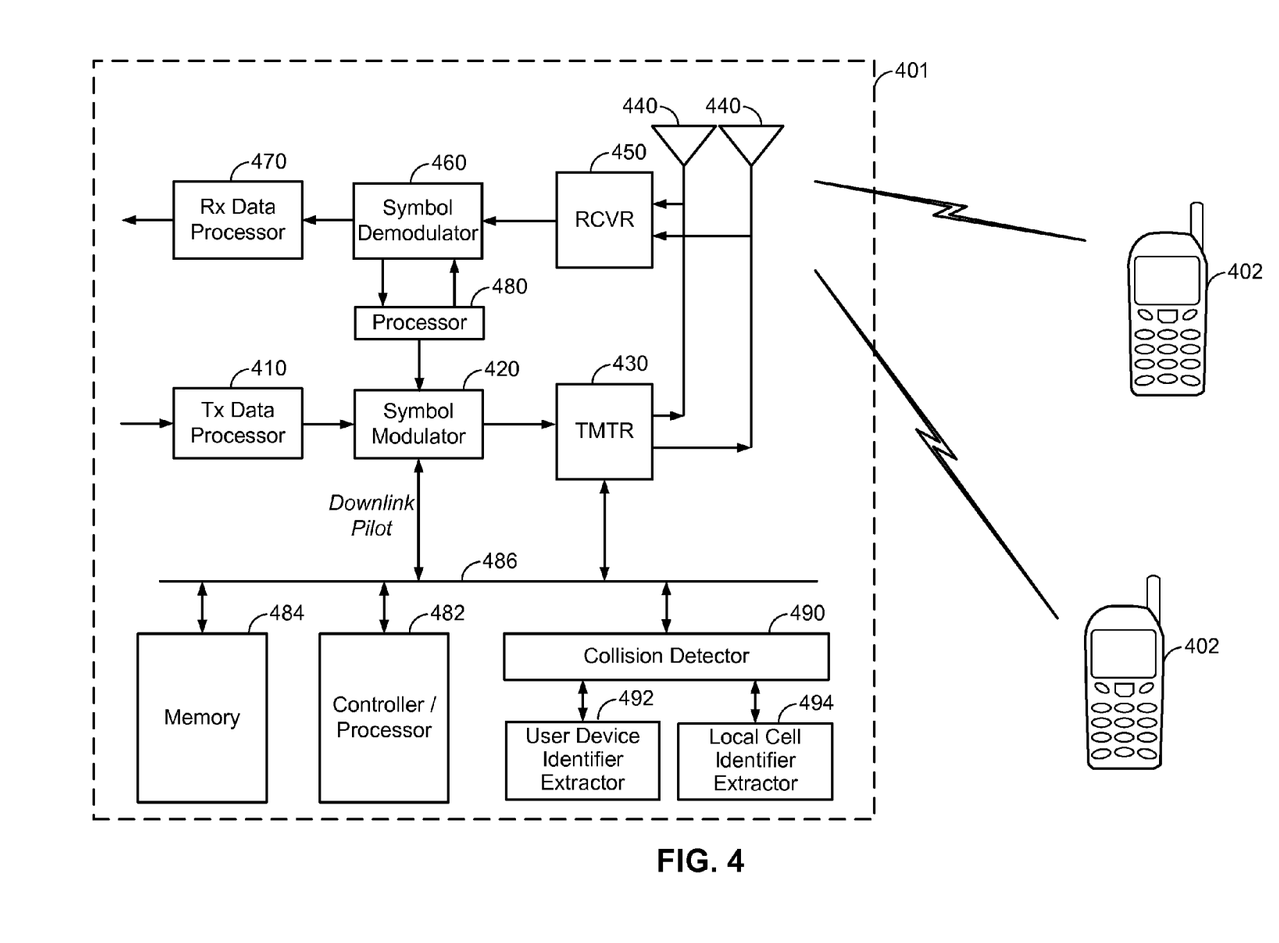
FIG. 4 illustrates an example of a base station apparatus configured to perform local cell identifier collision detection according to one or more of the embodiments described herein.

FIG. 4 illustrates an example of a base station apparatus configured to perform local cell identifier collision detection according to one or more of the embodiments described above. As shown, the base station apparatus 401 includes a corresponding TX data processor 410, symbol modulator 420, transmitter unit (TMTR) 430, antenna(s) 440, receiver unit (RCVR) 450, symbol demodulator 460, RX data processor 470, and configuration information processor 480, performing various operations for communicating with one or more user devices 402. The base station apparatus 401 may also include one or more general purpose controllers or processors (illustrated in the singular as the controller/processor 482) and memory 484 configured to store related data or instructions. Together, via a bus 486, these units may perform processing in accordance with the appropriate radio technology or technologies used for communication, as well as other functions for the base station apparatus 401.

According to various embodiments, the base station apparatus 401 may further include a collision detection module 490 for determining that there is a local cell identifier collision between the base station apparatus 401 and a second base station based on a dedicated identifier. As shown, the collision detection module 490 may make the determination based on information provided by other specially purposed modules, such as the illustrated user device identifier extraction module 492 and/or the local cell identifier extraction module 494. It will be appreciated that, in some designs, the functionality of one or more of the collision detection module 490, the user device identifier extraction module 492, or the local cell identifier extraction module 494 may be integrated directly into, or otherwise performed by, the general purpose controller/processor 482 of the base station apparatus 401, sometimes in conjunction with the memory 484.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit.

Additionally, the various illustrative flow diagrams, logical blocks, modules and/or algorithm steps described herein may also be coded as computer-readable instructions carried on any computer-readable medium known in the art or implemented in any computer program product known in the art. Computer-readable media include both computer storage media and communication media including any medium that facilitates transfer of a computer program from one place to another. A storage medium may be any available medium that can be accessed by a computer. By way of example, and not limitation, such computer-readable media may include RAM, ROM, EEPROM, CD-ROM or other optical disc storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a medium. Disk and disc, as used herein, include compact disc (CD), laser disc, optical disc, digital versatile disc (DVD), floppy disk and blu-ray disc, where disks usually reproduce data magnetically, and discs reproduce data optically with lasers. Combinations of the above should also be included within the scope of computer-readable media.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A method for detecting local cell identifier collision by a base station, comprising:
    receiving, at a first base station from a user device, a preamble signature assigned to the user device and a local cell identifier;
    determining, at the first base station, that there is a local cell identifier collision between the first base station and a second base station based on the preamble signature and the local cell identifier; and
    modifying or causing to be modified, by the first base station, one or more communication parameters of the first base station or the second base station in response to the local cell identifier collision.

2. The method of claim 1, wherein the preamble signature is associated with an access signature, an access probe, a random access probe, a signature sequence, a Random Access Channel (RACH) signature sequence, or a Physical RACH (PRACH) signature sequence.

3. The method of claim 1, wherein the determining is in response to the first base station not having assigned the preamble signature to any user devices.

4. The method of claim 1, wherein the determining is in response to the first base station having assigned the preamble signature to a user device under its control and the preamble signature being received at an unexpected time.

5. The method of claim 4, wherein the unexpected time corresponds to a time when the user device does not have any uplink data awaiting transmission.

6. An apparatus for detecting local cell identifier collision by a base station, comprising:

a receiver configured to receive, at a first base station from a user device, a preamble signature assigned to the user device and a local cell identifier;
at least one processor; and
at least one memory coupled to the at least one processor, the at least one processor and the at least one memory being configured to:
  determine, at the first base station, that there is a local cell identifier collision between the first base station and a second base station based on the preamble signature and the local cell identifier, and
  modify or causing to be modified, by the first base station, one or more communication parameters of the first base station or the second base station in response to the local cell identifier collision.

7. The apparatus of claim 6, wherein the preamble signature is associated with an access signature, an access probe, a random access probe, a signature sequence, a Random Access Channel (RACH) signature sequence, or a Physical RACH (PRACH) signature sequence.

8. The apparatus of claim 6, wherein the at least one processor and the at least one memory are configured to determine that there is a local cell identifier collision in response to the first base station not having assigned the preamble signature to any user devices.

9. The apparatus of claim 6, wherein the at least one processor and the at least one memory are configured to determine that there is a local cell identifier collision in response to the first base station having assigned the preamble signature to a user device under its control and the preamble signature being received at an unexpected time.

10. The apparatus of claim 9, wherein the unexpected time corresponds to a time when the user device does not have any uplink data awaiting transmission.

11. An apparatus for detecting local cell identifier collision by a base station, comprising:
  means for receiving, at a first base station from a user device, a preamble signature assigned to the user device and a local cell identifier;
  means for determining, at the first base station, that there is a local cell identifier collision between the first base station and a second base station based on the preamble signature and the local cell identifier; and
  means for modifying or causing to be modified, by the first base station, one or more communication parameters of the first base station or the second base station in response to the local cell identifier collision.

12. The apparatus of claim 11, wherein the preamble signature is associated with an access signature, an access probe, a random access probe, a signature sequence, a Random Access Channel (RACH) signature sequence, or a Physical RACH (PRACH) signature sequence.

13. The apparatus of claim 11, wherein the means for determining comprises means for determining that there is a local cell identifier collision in response to the first base station not having assigned the preamble signature to any user devices.

14. The apparatus of claim 11, wherein the means for determining comprises means for determining that there is a local cell identifier collision in response to the first base station having assigned the preamble signature to a user device under its control and the preamble signature being received at an unexpected time.

15. The apparatus of claim 14, wherein the unexpected time corresponds to a time when the user device does not have any uplink data awaiting transmission.

16. A non-transitory computer-readable medium comprising code, which, when executed by at least one processor, causes the at least one processor to perform operations for detecting local cell identifier collision by a base station, the non-transitory computer-readable medium comprising:
  code for receiving, at a first base station from a user device, a preamble signature assigned to the user device and a local cell identifier;
  code for determining, at the first base station, that there is a local cell identifier collision between the first base station and a second base station based on the preamble signature and the local cell identifier; and
  code for modifying or causing to be modified, by the first base station, one or more communication parameters of the first base station or the second base station in response to the local cell identifier collision.

17. The non-transitory computer-readable medium of claim 16, wherein the preamble signature is associated with an access signature, an access probe, a random access probe, a signature sequence, a Random Access Channel (RACH) signature sequence, or a Physical RACH (PRACH) signature sequence.

18. The non-transitory computer-readable medium of claim 16, wherein the code for determining comprises code for determining that there is a local cell identifier collision in response to the first base station not having assigned the preamble signature to any user devices.

19. The non-transitory computer-readable medium of claim 16, wherein the code for determining comprises code for determining that there is a local cell identifier collision in response to the first base station having assigned the preamble signature to a user device under its control and the preamble signature being received at an unexpected time.

20. The non-transitory computer-readable medium of claim 19, wherein the unexpected time corresponds to a time when the user device does not have any uplink data awaiting transmission.

* * * * *